UNITED STATES PATENT OFFICE.

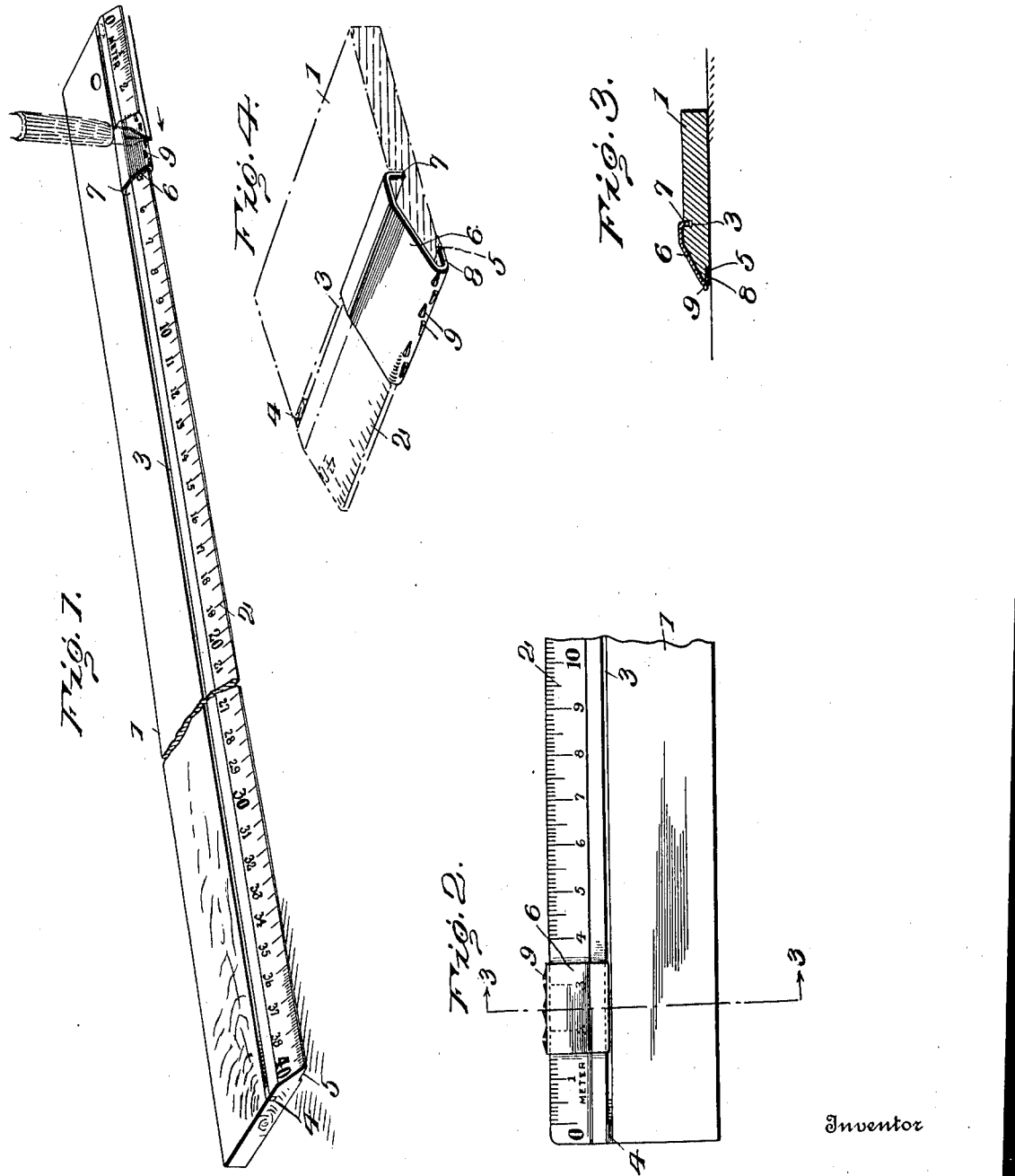

WILLIAM A. CALDWELL, OF MANILA, PHILIPPINE ISLANDS.

RULER ATTACHMENT.

1,035,818.  Specification of Letters Patent.  Patented Aug. 13, 1912.

Application filed November 17, 1911. Serial No. 660,932.

*To all whom it may concern:*

Be it known that I, WILLIAM A. CALDWELL, citizen of the United States, residing at Manila, Province of Luzon, Philippine Islands, have invented certain new and useful Improvements in Ruler Attachments, of which the following is a specification.

This invention relates to a ruler attachment, and has for its object to provide a guard slidably mounted upon a rule for movement longitudinally thereof along its forward or graduated edge.

With this object in view the invention consists in providing in the upper side of the rule a groove extending longitudinally of the scale or graduations and providing the under side of the rule at its graduated edge with a recess which extends the length of the rule. A guard is provided with end portions which are slidably received in the said groove and recess and extends around the graduations at the forward edge of the rule and is provided at its outer forward surface with tangs which are adapted to be engaged by the point of a pen, whereby the guard is moved longitudinally of the rule as the pen is moved along its graduated edge. By such an arrangement, as the pen is used for ruling straight lines, the ink from the same cannot get upon the graduations of the rule or upon the body of the rule proper, but such ink as escapes from the pen will lodge upon the guard. This is of metal and consequently is nonabsorbent and therefore the ink may be readily wiped from the guard.

For a full understanding of the invention reference is to be had to the following description and accompanying drawing in which:

Figure 1 is a perspective view of a ruler with the attachment applied; Fig. 2 is a plan view of a portion of the ruler and attachment; Fig. 3 is a transverse sectional view of the same; and Fig. 4 is a perspective view of the attachment.

Corresponding and like parts are referred to in the following description and indicated in all the views of the accompanying drawing by the same reference characters.

The rule 1 to which the attachment is applied is of the usual pattern and is provided upon its upper side between its forward and back edges and behind its graduations 2 with a longitudinally disposed groove 3 which extends the length of the rule and is parallel with the long edges thereof. The groove 3 is closed at its ends by inserted blocks 4. The rule 1 is provided upon its under side and at its graduated edge with a longitudinally disposed recess 5 which extends the length of the rule.

The guard 6 is slidably mounted upon the graduated edge of the rule and is formed from a strip of thin metal having an end portion 7 which is snugly received within the groove 3. The intermediate portion of the guard 6 lies flat over the graduations of the rule and the said strip extends around the graduated edge of the rule with its other end portion 8 snugly received in the said recess. The guard 6 is provided upon its outer surface at that part which is bent around the graduated edge of the rule with outstanding prongs 9 which are struck up from the metal of which the said guard is composed. These prongs have end portions which are approximately at right angles to the long dimension of the rule and against these ends or shoulders a ruling pen may be placed when straight lines are being ruled, so that by moving the pen along the graduated edge of the rule the guard 6 will follow the pen and thus prevent any ink from passing from the pen onto the body of the rule. Any ink that escapes from the pen will lodge upon the guard, and as this is made of non-absorbent material it may be readily wiped from the same. Therefore the rule may be freely used for guiding a pen and at the same time there is no danger of the graduations thereof becoming obliterated or the rule soiled. The blocks 4 in the ends of the groove 3 will prevent the guard 6 from slipping off of the ends of the rule and therefore for all practical purposes the parts are permanently assembled.

Having thus described the invention, what is claimed as new is:

1. In combination with a rule having upon its upper side a longitudinally disposed groove and upon its lower side and at its edge a longitudinally disposed recess, a guard having an end portion snugly received in the groove and an opposite end portion snugly received in the recess, said guard extending around the edge of the rule.

2. In combination with a rule having upon its upper side a longitudinally disposed groove and upon its lower side and at its edge a longitudinally disposed recess, blocks inserted in the ends of the groove, a guard having an end portion snugly received in the groove between the blocks, said guard
5 extending around the edge of the rule and having its other end portion snugly received within the said recess.

In testimony whereof I affix my signature in presence of two witnesses.

WILLIAM A. CALDWELL. [L. S.]

Witnesses:
    ROBERT G. WOODS,
    CLARENCE B. SHAW.

Copies of this patent may be obtained for five cents each, by addressing the "Commissioner of Patents, Washington, D. C."